United States Patent [19]
Collins, Jr. et al.

[11] Patent Number: 6,155,489
[45] Date of Patent: Dec. 5, 2000

[54] ITEM CHECKOUT DEVICE INCLUDING A BAR CODE DATA COLLECTOR AND A PRODUCE DATA COLLECTOR

[75] Inventors: Donald A. Collins, Jr., Lawrenceville, Ga.; Jeffrey P. Treptau, Golden Valley, Minn.; Michael A. Spencer, Suwanee; Daniel B. Seevers, Duluth, both of Ga.

[73] Assignee: NCR Corporation, Dayton, Ohio

[21] Appl. No.: 09/189,781

[22] Filed: Nov. 10, 1998

[51] Int. Cl.⁷ .................................................. G06K 7/10
[52] U.S. Cl. ........................... 235/462.01; 235/462.11; 235/462.14; 356/328
[58] Field of Search .................. 235/462.01, 462.11, 235/462.14, 462.41, 462.42, 383; 186/61; 356/328, 326

[56] References Cited

U.S. PATENT DOCUMENTS

| | | |
|---|---|---|
| D. 377,342 | 1/1997 | Lin .......................................... D14/107 |
| D. 385,810 | 11/1997 | Beckstrom et al. ...................... D10/91 |
| D. 389,076 | 1/1998 | Beckstrom et al. ...................... D10/91 |
| 3,737,239 | 6/1973 | Adams et al. ............................ 356/177 |
| 3,774,014 | 11/1973 | Berler ................................. 235/61.11 E |
| 3,796,863 | 3/1974 | Nickl et al. ......................... 235/61.11 E |
| 3,865,490 | 2/1975 | Grossman ................................... 356/76 |
| 3,970,375 | 7/1976 | Blau, Jr. et al. ......................... 350/312 |
| 3,973,849 | 8/1976 | Jackson et al. ............................ 356/97 |
| 4,043,646 | 8/1977 | Heine et al. .............................. 350/315 |
| 4,060,327 | 11/1977 | Jacobowitz et al. ....................... 356/96 |
| 4,106,628 | 8/1978 | Warkentin et al. ................... 209/74 M |
| 4,120,591 | 10/1978 | van Valkenburg ...................... 356/178 |
| 4,136,954 | 1/1979 | Jamieson ................................. 356/349 |
| 4,175,862 | 11/1979 | DiMatteo et al. ....................... 356/375 |
| 4,260,262 | 4/1981 | Webster ................................... 356/418 |
| 4,281,933 | 8/1981 | Houston et al. ......................... 356/425 |
| 4,319,830 | 3/1982 | Roach ......................................... 355/1 |
| 4,365,148 | 12/1982 | Whitney ................................... 235/383 |
| 4,515,275 | 5/1985 | Mills et al. .............................. 209/558 |
| 4,529,308 | 7/1985 | Rife .......................................... 356/323 |
| 4,532,757 | 8/1985 | Tutle ................................... 56/328 R |
| 4,534,470 | 8/1985 | Mills ....................................... 209/585 |
| 4,558,786 | 12/1985 | Lane ........................................ 209/558 |
| 4,558,953 | 12/1985 | Yamada ................................... 356/409 |
| 4,678,904 | 7/1987 | Saaski et al. ............................ 250/227 |
| 4,693,330 | 9/1987 | Uchimura et al. ......................... 177/25 |
| 4,735,323 | 4/1988 | Okada et al. ............................ 209/582 |
| 4,750,161 | 6/1988 | Takeuchi et al. .......................... 369/45 |
| 4,779,982 | 10/1988 | Koshi et al. ............................. 356/318 |
| 4,810,937 | 3/1989 | Havel ....................................... 315/152 |
| 4,888,647 | 12/1989 | Wada ....................................... 358/474 |
| 4,899,348 | 2/1990 | Kiya et al. ................................. 372/38 |
| 4,907,884 | 3/1990 | Wyatt et al. ............................. 356/336 |
| 4,912,906 | 4/1990 | Toner ......................................... 53/463 |
| 4,917,500 | 4/1990 | Lugos ...................................... 356/406 |
| 4,928,008 | 5/1990 | Huggins et al. ...................... 250/231.1 |
| 4,930,865 | 6/1990 | Dosmann ................................. 350/169 |

(List continued on next page.)

*Primary Examiner*—Donald Hajec
*Assistant Examiner*—Daniel St. Cyr
*Attorney, Agent, or Firm*—Paul W. Martin

[57] ABSTRACT

An item checkout device which combines a produce data collector with an optical bar code data collector. The item checkout device includes a housing, a bar code data collector within the housing, and a produce data collector within the housing. In a preferred embodiment, the item checkout device includes an optical bar code data collector including a first housing, a scale within the first housing, a weigh plate on the scale including a first window for allowing scanning light beams from optical bar code data collector to pass and a second window, and a produce data collector within the first housing including a second housing containing an aperture adjacent the second window, a light source for illuminating a produce item on the second window with substantially uniform light, a light separating element for splitting light collected from the produce item into a plurality of different light portions having different wavelengths, a detector for converting energy in the plurality of light portions into a plurality of electrical signals, and control circuitry which digitizes the plurality of electrical signals to produce a digital spectrum from the produce item which contains information to identify the produce item for the purpose of determining its unit price.

13 Claims, 13 Drawing Sheets

6,155,489
Page 2

U.S. PATENT DOCUMENTS

| | | | |
|---|---|---|---|
| 4,944,594 | 7/1990 | Burk | 356/446 |
| 4,954,972 | 9/1990 | Sullivan | 364/526 |
| 4,964,053 | 10/1990 | Humble | 364/466 |
| 4,968,138 | 11/1990 | Scott et al. | 356/121 |
| 5,000,569 | 3/1991 | Nylund | 356/237 |
| 5,021,645 | 6/1991 | Satula et al. | 250/223 R |
| 5,042,619 | 8/1991 | Kohno | 186/61 |
| 5,083,638 | 1/1992 | Schneider | 186/61 |
| 5,085,325 | 2/1992 | Jones et al. | 209/580 |
| 5,095,319 | 3/1992 | Watarai et al. | 346/108 |
| 5,097,291 | 3/1992 | Suzuki | 355/69 |
| 5,115,888 | 5/1992 | Schneider | 186/61 |
| 5,153,926 | 10/1992 | Jansson et al. | 382/54 |
| 5,166,755 | 11/1992 | Gat | 356/419 |
| 5,216,232 | 6/1993 | Knowles et al. | 235/462.01 |
| 5,229,588 | 7/1993 | Detwiler et al. | 235/383 |
| 5,247,373 | 9/1993 | Iwama et al. | 358/471 |
| 5,258,825 | 11/1993 | Reed et al. | 356/402 |
| 5,286,980 | 2/1994 | Richert | 250/560 |
| 5,309,270 | 5/1994 | Yamakawa | 359/196 |
| 5,319,437 | 6/1994 | Van Aken et al. | 356/326 |
| 5,325,445 | 6/1994 | Herbert | 382/38 |
| 5,333,739 | 8/1994 | Stelte | 209/582 |
| 5,339,107 | 8/1994 | Henry et al. | 348/270 |
| 5,404,004 | 4/1995 | Sato et al. | 235/463 |
| 5,420,681 | 5/1995 | Woodruff | 356/326 |
| 5,426,282 | 6/1995 | Humble | 235/383 |
| 5,428,558 | 6/1995 | Cahill et al. | 364/571.02 |
| 5,444,528 | 8/1995 | Puschell | 356/73 |
| 5,449,911 | 9/1995 | Crezee | 250/341.7 |
| 5,453,883 | 9/1995 | Chazallet | 359/890 |
| 5,461,698 | 10/1995 | Schwanke et al. | 395/22 |
| 5,471,052 | 11/1995 | Ryczek | 250/226 |
| 5,471,311 | 11/1995 | van den Bergh et al. | 356/446 |
| 5,479,258 | 12/1995 | Hinnrichs et al. | 356/326 |
| 5,483,335 | 1/1996 | Tobias | 356/310 |
| 5,483,339 | 1/1996 | Van Aken et al. | 356/326 |
| 5,494,136 | 2/1996 | Humble | 186/61 |
| 5,495,096 | 2/1996 | Ogata et al. | 235/462 |
| 5,537,211 | 7/1996 | Dial | 356/402 |
| 5,537,488 | 7/1996 | Menon et al. | 382/170 |
| 5,546,475 | 8/1996 | Bolle et al. | 382/190 |
| 5,642,197 | 6/1997 | Tuhro et al. | 356/418 |
| 5,646,399 | 7/1997 | Fukushima et al. | 250/226 |
| 5,649,070 | 7/1997 | Connell et al. | 395/77 |
| 5,659,624 | 8/1997 | Fazzari et al. | 382/110 |
| 5,675,070 | 10/1997 | Gelperin | 73/23.34 |
| 5,675,419 | 10/1997 | Van Den Bergh et al. | 356/446 |
| 5,678,132 | 10/1997 | Shiba et al. | 399/59 |
| 5,680,220 | 10/1997 | Delignieres et al. | 356/406 |
| 5,684,582 | 11/1997 | Eastman et al. | 356/328 |
| 5,867,265 | 2/1999 | Thomas | 356/328 |

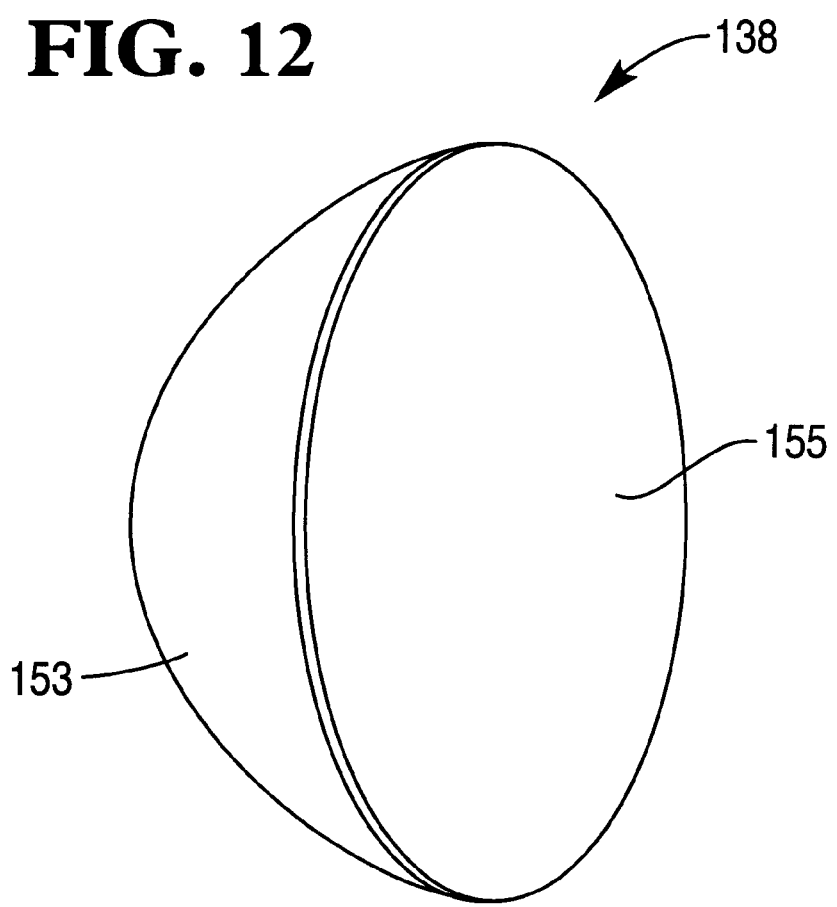

ITEM CHECKOUT DEVICE INCLUDING A BAR CODE DATA COLLECTOR AND A PRODUCE DATA COLLECTOR

CROSS-REFERENCE TO RELATED APPLICATIONS

The present invention is related to the following commonly assigned and co-pending U.S. application: "A Produce Data Collector And A Produce Recognition System", filed Nov. 10, 1998, invented by Gu, and having a Ser. No. 09/189,783.

BACKGROUND OF THE INVENTION

The present invention relates to product checkout devices and more specifically to an item checkout device including a bar code data collector and a produce data collector.

Bar code readers are well known for their usefulness in retail checkout and inventory control. Bar code readers are capable of identifying and recording most items during a typical transaction since most items are labeled with bar codes.

Items which are typically not identified and recorded by a bar code reader are produce items, since produce items are typically not labeled with bar codes. Bar code readers may include a scale for weighing produce items to assist in determining the price of such items. But identification of produce items is still a task for the checkout operator, who must identify a produce item and then manually enter an item identification code. Operator identification methods are slow and inefficient because they typically involve a visual comparison of a produce item with pictures of produce items. Operator identification methods are also prone to error, on the order of fifteen percent.

Therefore, it would be desirable to provide a produce recognition system which can minimize operator involvement in produce identification and entry into a transaction. It would also be desirable to provide a combined bar code reader and produce recognition system in order to maintain operator focus for item entry on a single area of a checkout counter, the area where the bar code reader is located.

SUMMARY OF THE INVENTION

In accordance with the teachings of the present invention, an item checkout device including a bar code data collector and a produce data collector is provided.

The item checkout device includes a housing, a bar code data collector within the housing, and a produce data collector within the housing.

In a preferred embodiment, the item checkout device includes an optical bar code data collector including a first housing, a scale within the first housing, a weigh plate on the scale including a first window for allowing scanning light beams from optical bar code data collector to pass and a second window, and a produce data collector within the first housing including a second housing containing an aperture adjacent the second window, a light source for illuminating a produce item on the second window with substantially uniform light, a light separating element for splitting light collected from the produce item into a plurality of different light portions having different wavelengths, a detector for converting energy in the plurality of light portions into a plurality of electrical signals, and control circuitry which digitizes the plurality of electrical signals to produce a digital spectrum from the produce item which contains information to identify the produce item for the purpose of determining its unit price.

A method of the recording a purchase of a produce item under the present invention includes the steps of generating substantially uniform light from within a housing of an item checkout device including a bar code data collector and a scale, illuminating the produce item as it rests upon a window in a weigh plate on the scale, recording a weight of the produce item as it rests upon the window in the weigh plate, determining a digital spectrum from light collected from the produce item, comparing the digital spectrum to reference spectra to identify the produce item, and determining price information for the produce item from weight information and identification information.

It is a feature of the preferred embodiment of the present invention that the item checkout device combines a produce data collector with an optical bar code data collector into a single checkout device without disturbing operation of the optical bar code data collector.

It is accordingly an object of the present invention to provide an item checkout device including a bar code data collector and a produce data collector.

It is another object of the present invention to insert a produce data collector into an optical bar code scanner without interfering with the laser beam emitted by the optical bar code scanner.

It is another object of the present invention to use the same checkout space for recognizing produce as is used for reading bar codes.

It is another object of the present invention to provide a produce data collector which is small enough to be mounted within a bar code scanner.

It is another object of the present invention to provide a single item checkout device which includes both a bar code data collector and a produce data collector.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 12 is a perspective view of an alternate turning mirror design; and

DETAILED DESCRIPTION OF THE PREFERRED EMBODIMENT

Figure 1:
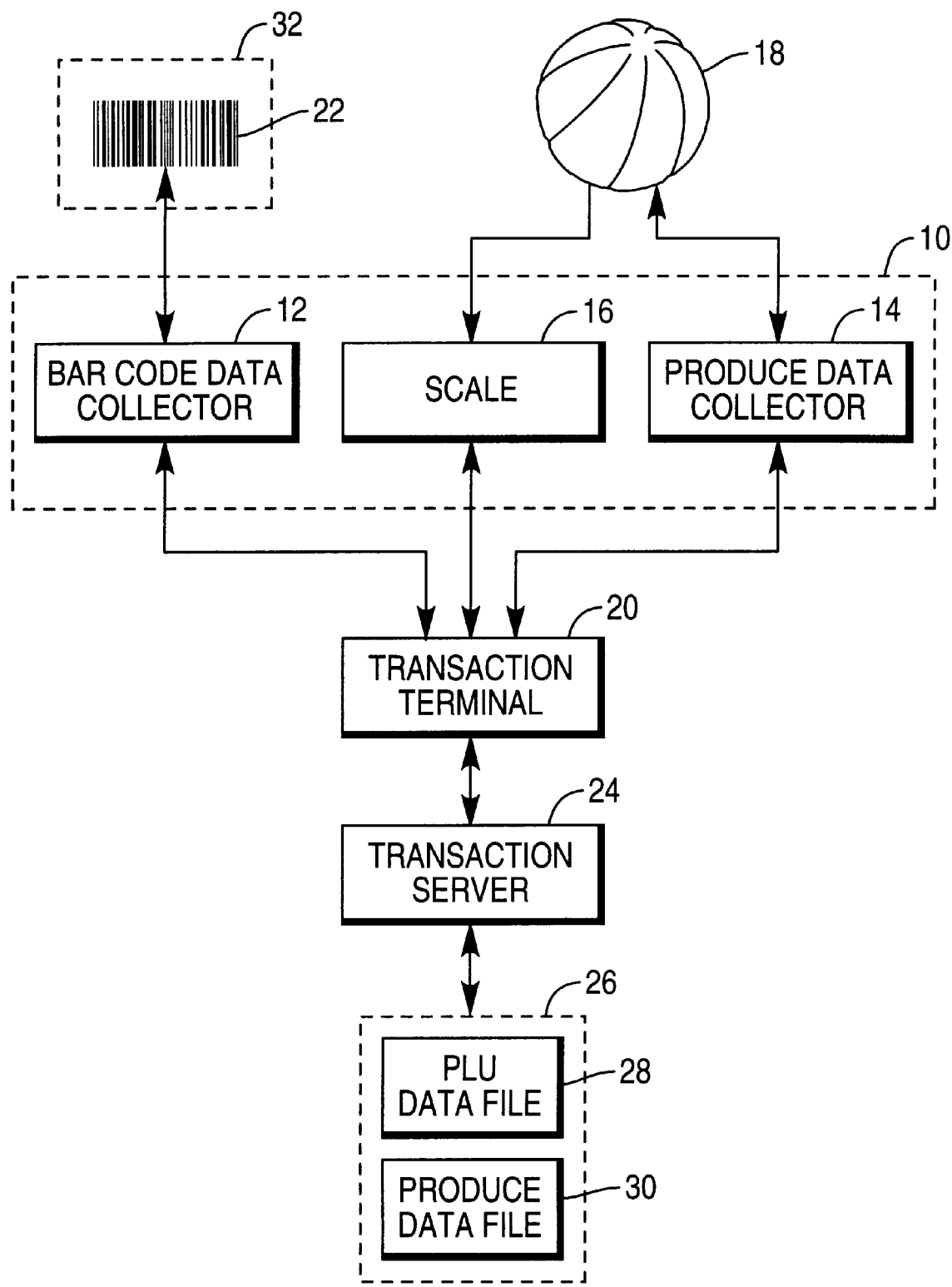
FIG. 1 is a block diagram of a transaction processing system including the item checkout device of the present invention.

Referring now to FIG. 1, item checkout device 10 includes bar code data collector 12, produce data collector 14, and scale 16.

Bar code data collector 12 reads bar code 22 on merchandise item 32 to obtain item identification information, also known as a price look-up (PLU) number, associated with item 32. Bar code data collector 12 may be any bar code data collector, including an optical bar code scanner which uses laser beams to read bar codes. Bar code data collector 12 may be located within a checkout counter or mounted on top of a checkout counter.

Produce data collector 14 collects data for produce item 18 or any other non-bar-coded merchandise item. Such data may include color and color distribution data, size data, shape data, and aromatic data. Reference produce data is collected and stored within produce data file 30. During a transaction, produce data is collected and compared to produce data within produce data file 30.

Scale 16 determines a weight for produce item 18. Scale 16 works in connection with bar code data collector 12, but may be designed to operate and be mounted separately. Scale 16 sends weight information for produce item 18 to transaction terminal 20 so that transaction terminal 20 can determine a price for produce item 18 based upon the weight information.

Bar code data collector 12 and produce data collector 14 may operate separately from each other or their operations may be integrated. For example, bar code data collector 12 and produce data collector 14 may include separate control circuits or share a single control circuit.

Bar code data collector 12 and produce data collector 14 operate separately from each other, but may be integrated together. Bar code data collector 12 works in conjunction with transaction terminal 20 and transaction server 24.

Transaction terminal 20 obtains price information for both bar coded and non-bar coded items from transaction server 24. In the case of bar coded items, transaction terminal 20 obtains the item identification number from bar code data collector 12 and retrieves a corresponding price from PLU data file 28 through transaction server 24.

In the case of non-bar coded produce items, transaction terminal 20 executes produce recognition software 21 which obtains produce data from produce data collector 14, identifies produce item 18 by comparing produce data in produce data file 30 with collected produce data, retrieves an item identification number from produce data file 30 and a corresponding price from PLU data file 28.

In an alternative embodiment, identification of produce item 18 may be handled by transaction server 24. Transaction server 24 receives collected produce characteristics and compares them with produce data in produce data file 30. Following identification, transaction server 24 obtains a price for produce item 18 and forwards it to transaction terminal 20.

In either case, transaction server 24 sends a corresponding unit price from PLU data file 28 to transaction terminal 20. Transaction terminal 20 calculates a price for produce item 18 by multiplying the unit price by the weight of produce item 18 obtained from scale 16.

PLU data file 28 and produce data file 30 are stored within storage medium 26, but either may instead/also be located instead at transaction terminal 20 or checkout device 10.

Figure 2:
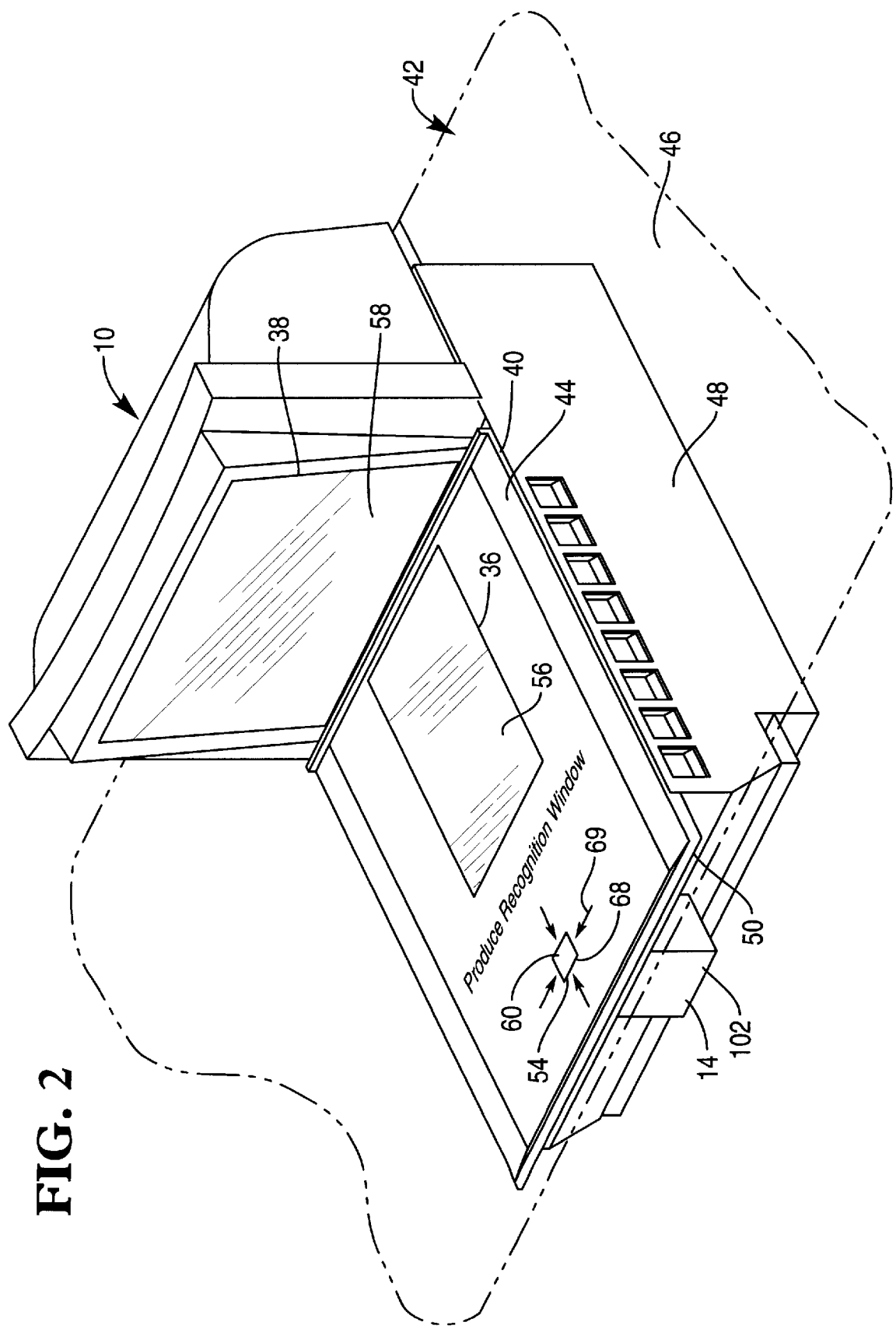
FIG. 2 is a perspective view of the item checkout device illustrating a first method of mounting a produce data collector.
Figure 3:
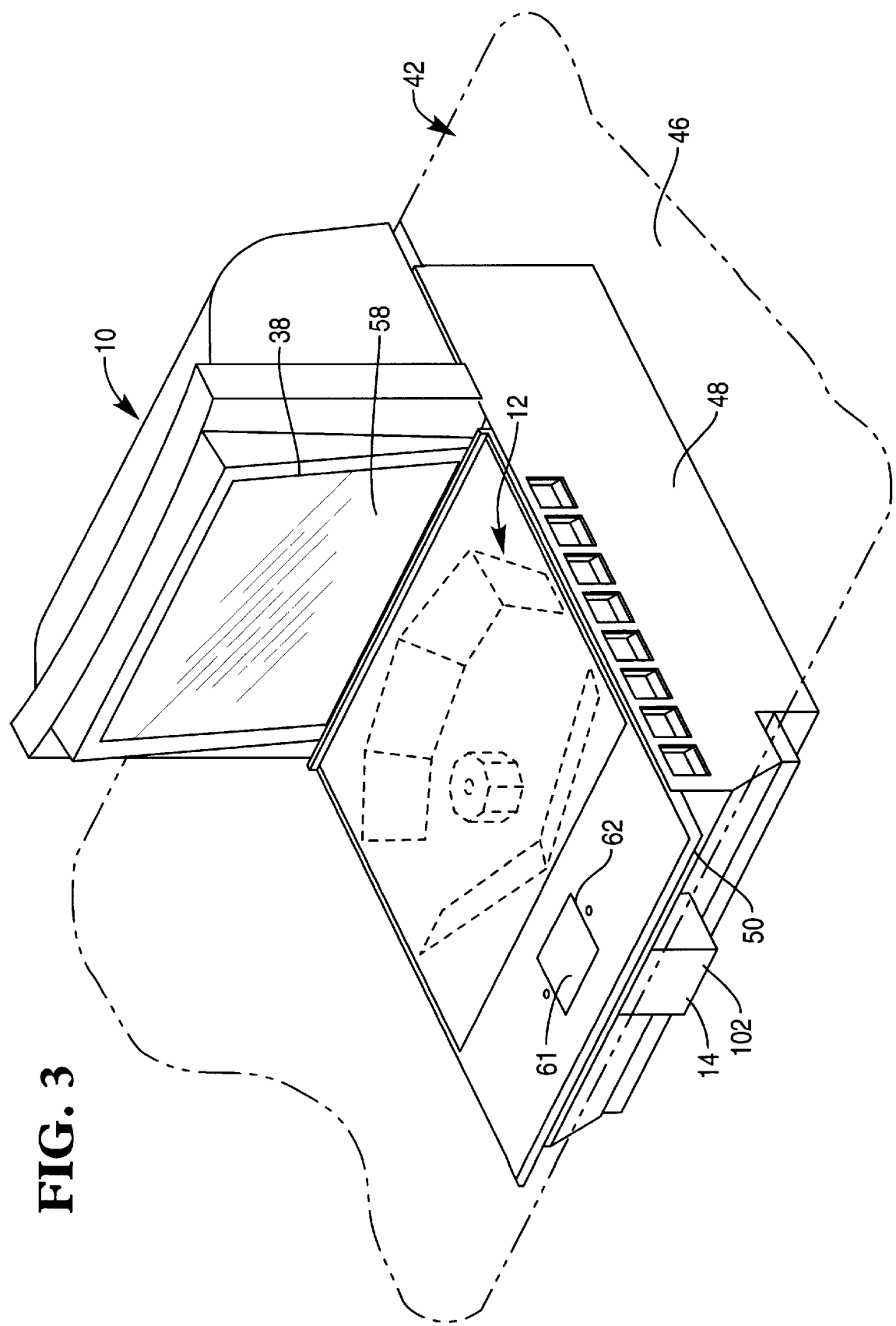
FIG. 3 is a view of the item checkout device of FIG. 2 without the scale weigh plate.

Turning now to FIGS. 2–3, device 10 includes housing 48, which is adopted from a housing from a model 7875 dual-aperture optical bar code scanner manufactured by the assignee of the present invention. Housing 48 includes vertical aperture 38. Aperture 38 includes transparent window 58 made of glass.

Bar code data collector 12 as illustrated includes the components of the model 7875 optical bar code scanner. Optical bar code scanners generally employ a laser diode, the light from which is focused and collimated to produce a scanning beam. An optical transceiver directs the beam against a mirrored polygon or spinner 64 and then against a plurality of stationary mirrors 66, and collects the beam after it is reflected by a bar code label. A motor rotates the mirrored polygon and a detector receives the returning beam. Control circuitry processes the reflected light and decodes bar code label 22.

Bar code data collector 12 directs scanning light beams towards bar code label 22 through aperture 36 within scale weigh plate 40 and aperture 38 within housing 48. Reflected light from bar code label 22 passes through apertures 36 and 38.

Scale 16 includes weigh plate 40. Housing 48 is mounted within checkout counter 42 so that top surface 44 of weigh plate 40 is substantially flush with top surface 46 of checkout counter 42. Scale weigh plate 40 includes aperture 36 used by bar code data collector 12 and aperture 54 used by produce data collector 14. Apertures 36 and 54 include transparent windows 56 and 60 made of glass. Transparent window 60 includes an anti-reflective surface material to prevent light generated by produce data collector 14 from contaminating collected produce data.

Weight plate 40 may include markings 69 to assist an operator in properly using produce data collector 14. Markings 69 preferably distinguish aperture 54 from aperture 36. For example, aperture 54 may include arrows and text (FIG. 2) which clearly identify the purpose of aperture 54 as produce recognition and which suggest to the operator to center produce item 18 over window 60. Markings 69 may also be concentric circles (FIG. 4) or other suitable distinguishing indicia. Markings 69 may be formed in a number of ways, including scribing, etching, or inlaying them into weigh plate 40.

Produce data collector 14 includes housing 102 which fastens to lip 50 of item housing 48 (FIG. 3). Produce data collector 14 directs light through aperture 62 in lip 50 and aperture 54 in weigh plate 40 towards produce item 18. Reflected light from produce item 18 passes through apertures 54 and 62 and is used by transaction terminal 20 to identify produce item 18.

Figure 4:
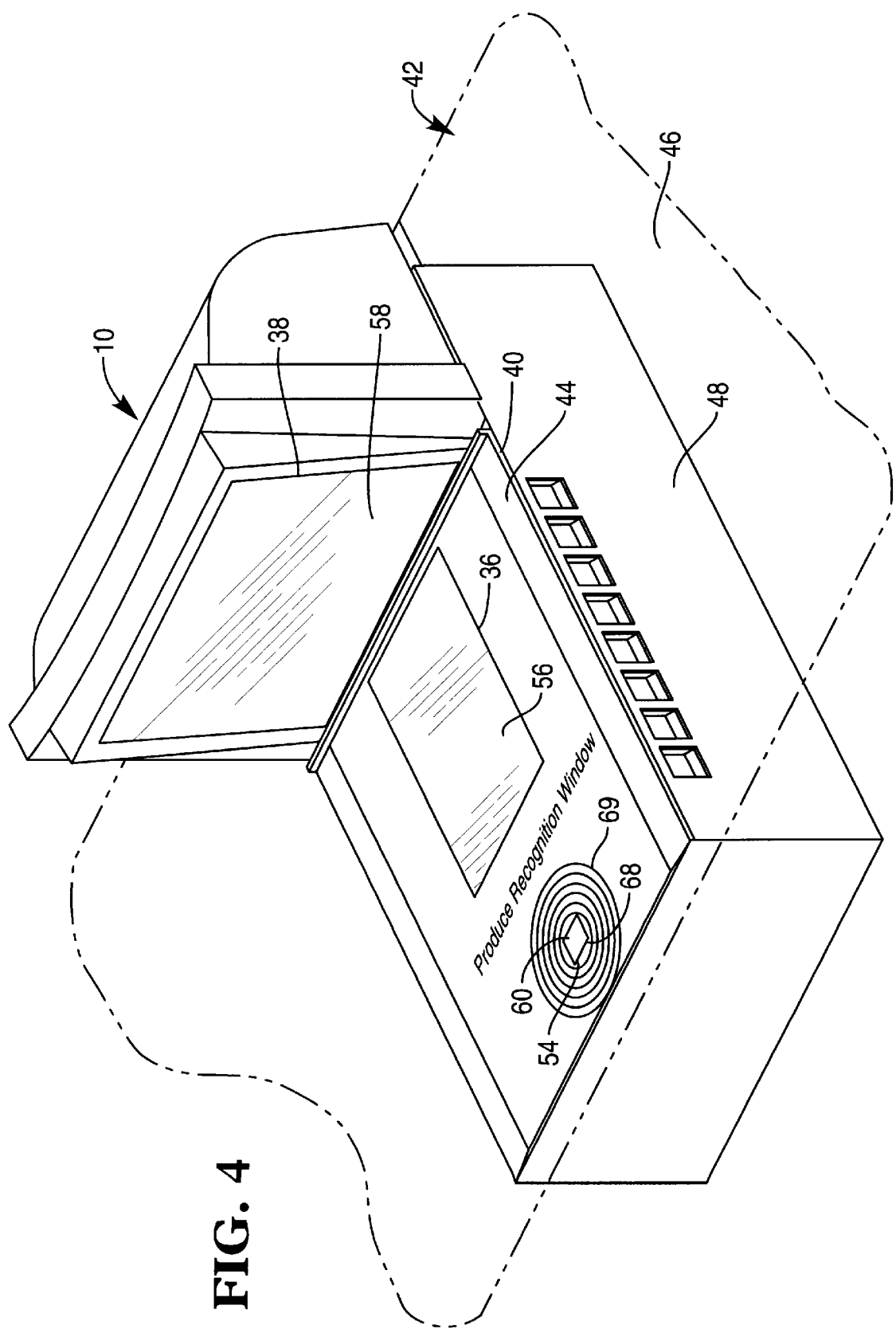
FIG. 4 is a perspective view of another item checkout device illustrating a second method of mounting a produce data collector.
Figure 5:
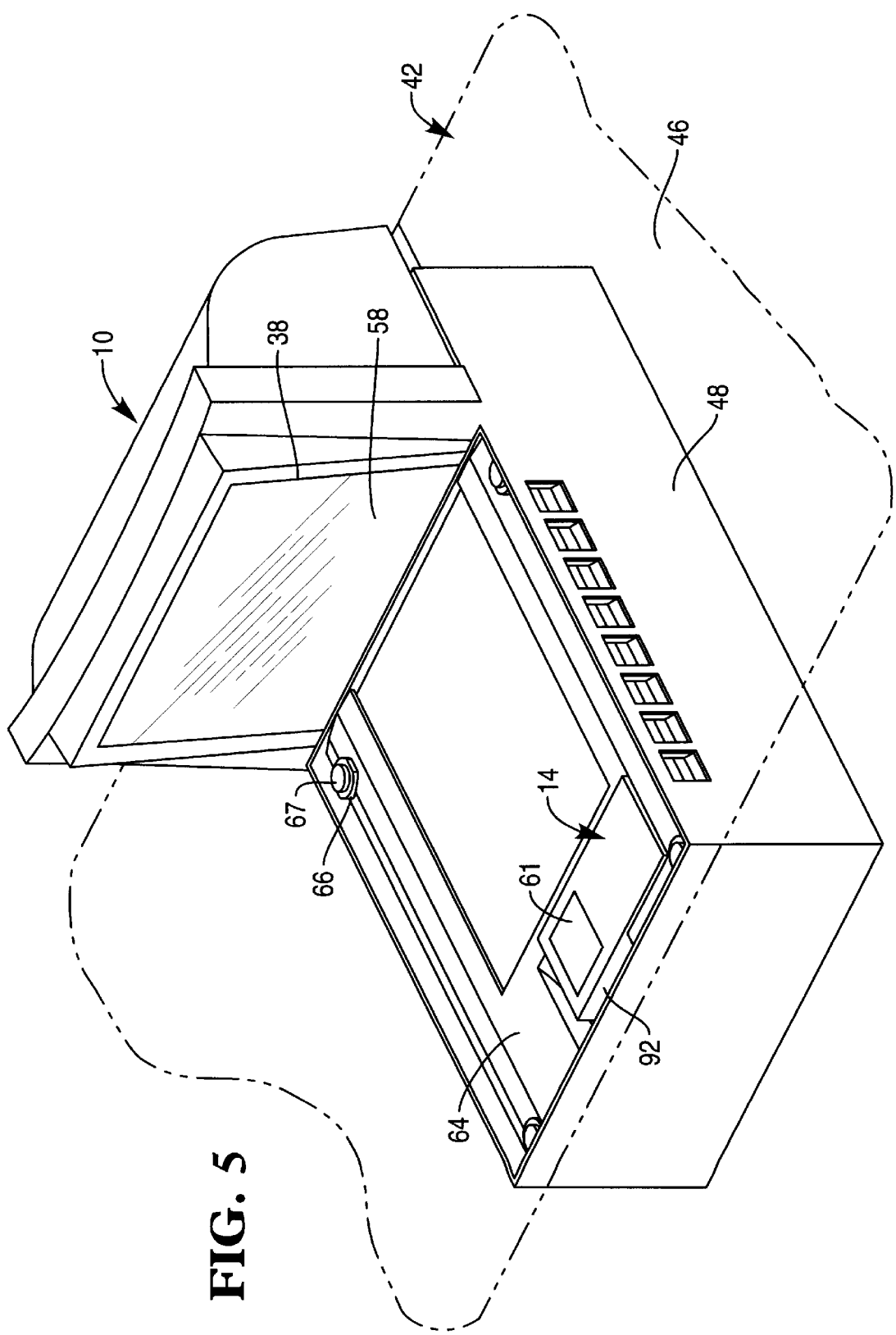
FIG. 5 is a view of the item checkout device of FIG. 4 without the scale weigh plate.
Figure 6:
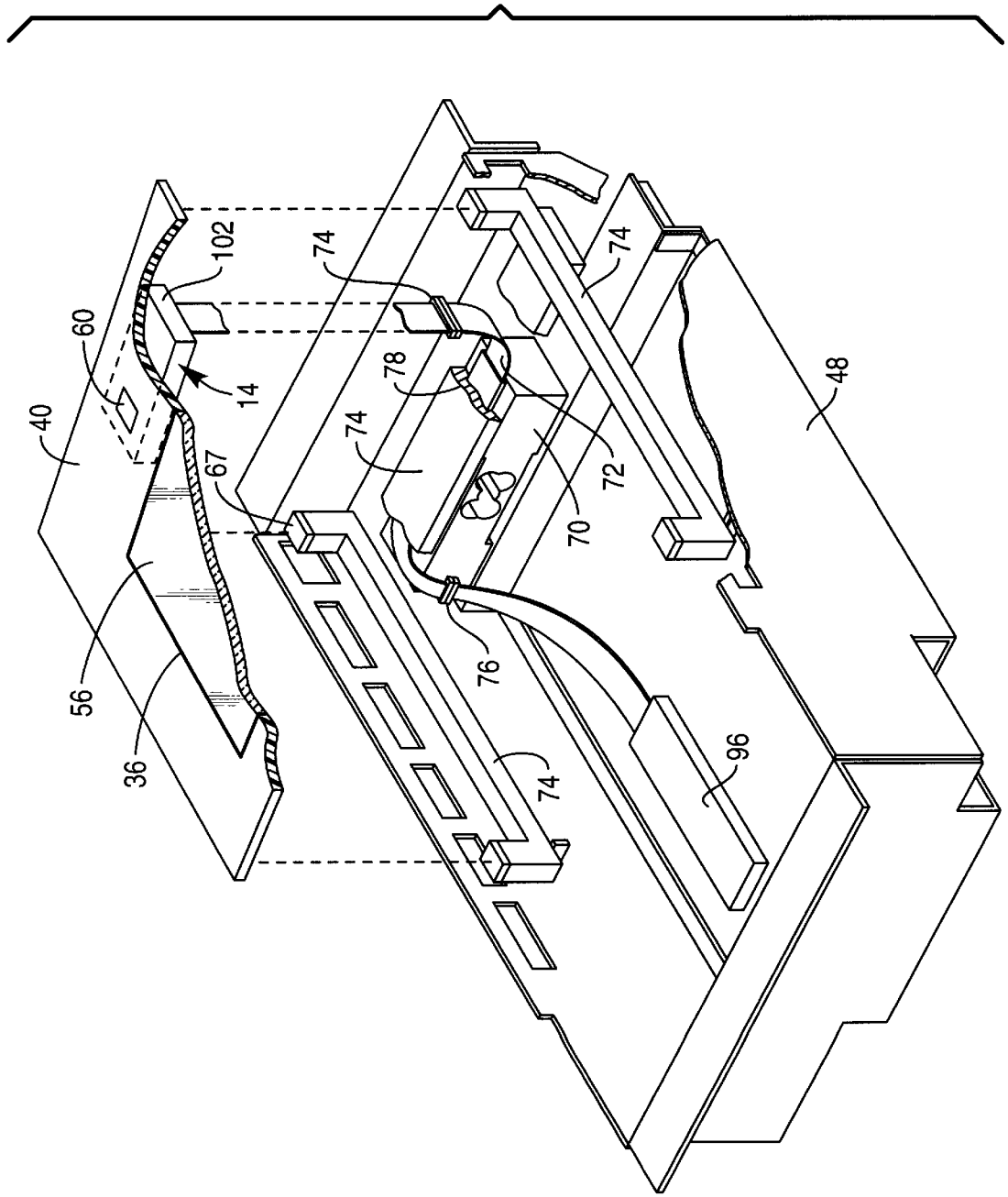
FIG. 6 is an exploded view of yet another item checkout device illustrating a third method of mounting a produce data collector.

Turning now to FIGS. 4–6, some bar code readers may include housings which minimize the size of lip 50. In such cases, produce data collector 14 is preferably mounted inside housing 48 in the same relative location, namely, outside pattern mirrors 66, so as not to obstruct the laser beam produced by bar code data collector 12.

With reference to FIGS. 4 and 5, housing 48 has no lip. Produce data collector 14 is mounted within support frame 64. Support frame 64 fastens to housing 48, but does not obstruct operation of bar code data collector 12 or scale 16. Frame 64 is generally U-shaped so as not to obstruct a laser beam directed towards aperture 36. Frame 64 also includes apertures 66 through which scale support members 67 pass unhindered. Thus, the presence of frame 64 does not affect scale readings.

With reference to FIG. 6, produce data collector 14 is mounted directly to the underside of weigh plate 40. In order to avoid erroneous scale readings from such an arrangement, cable 72 is attached to the top surface of load cell 70. Cable 72 provides power and data paths to produce data collector 14. Produce data collector 14 couples to connector 74 and control circuitry 96 couples to connector 76. Weigh scale support frame 74 fastens to the top surface of load cell 70 and has a channel 78 that allows cable 72 to pass through. This mounting arrangement may make transparent window 61 unnecessary.

Advantageously, produce data collector 14, including housing 102, does not interfere with the operation of bar code data collector 12. Bar code data collector 12 fits within the available space in housing 48. Thus, produce data collector 14 may be easily added to an existing bar code reader without expensive optical design changes to bar code data collector 12.

In operation, an operator moves merchandise item 32 over aperture 36 and past aperture 38 to read bar code label 22. The operator places produce item 18 on transparent window 60 to allow produce data collector 14 to collect produce data for produce item 18. Thus, locating produce data collector 14 with bar code data collector 12 focuses operator activity in a single area of checkout counter 42 defined by boundary of weigh plate 40. Separately locating produce data collector 14 would require two different areas of operator focus.

Figure 7:
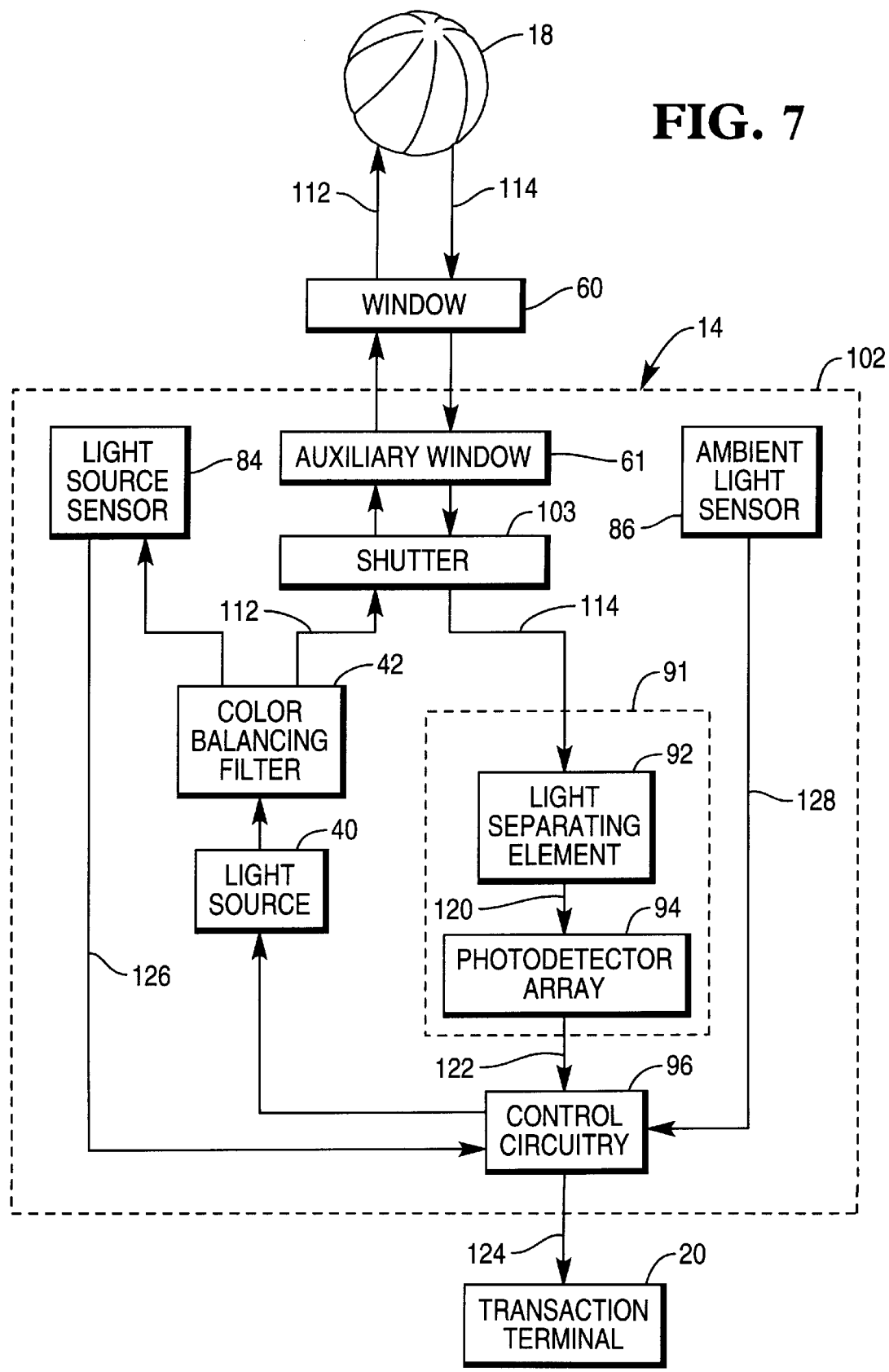
FIG. 7 is a block diagram of the produce data collector.
Figure 8:
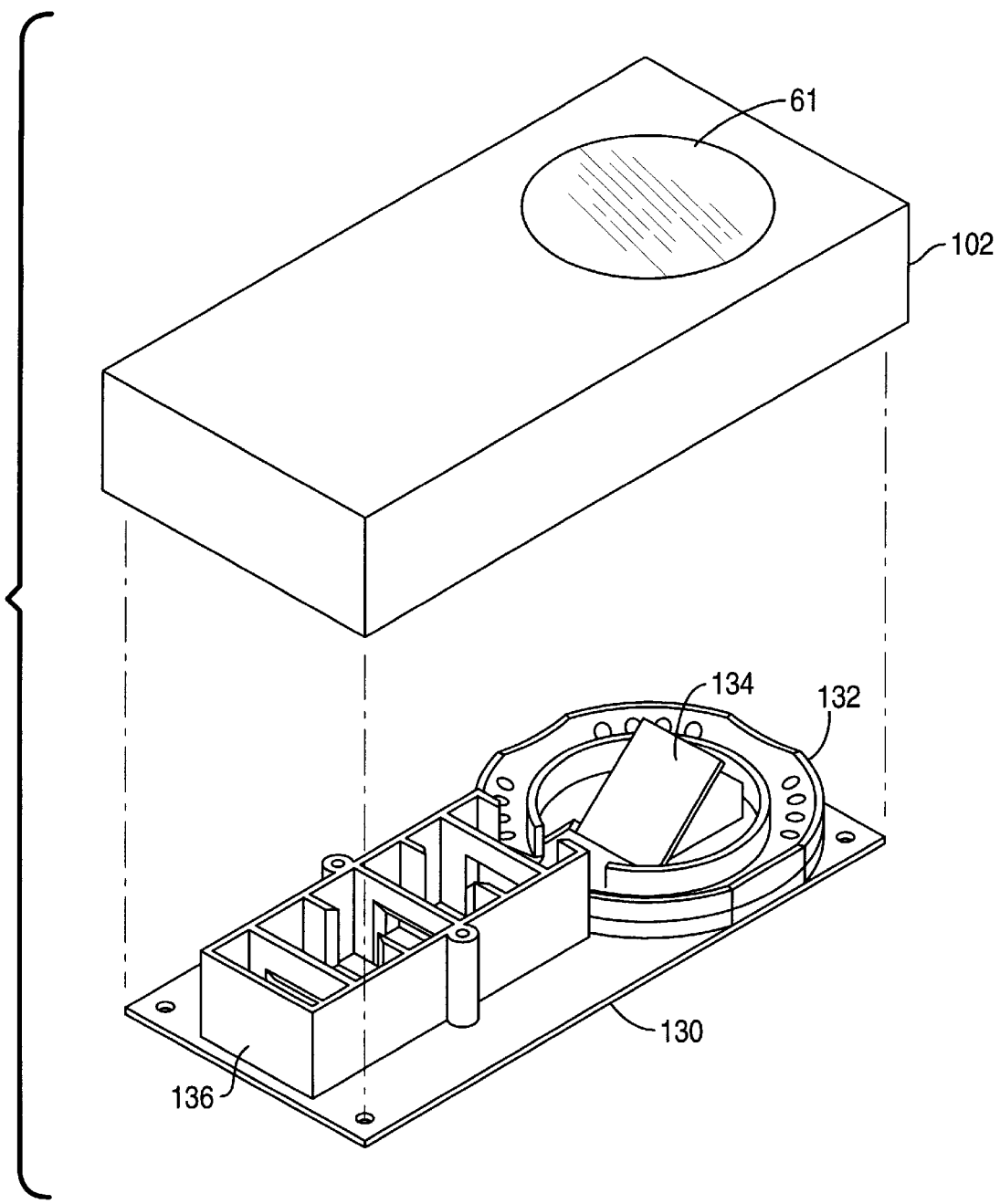
FIG. 8 is an exploded view of the produce data collector.

Turning now to FIG. 7, produce data collector 14 primarily includes light source 80, spectrometer 91, control circuitry 96, auxiliary transparent window 61, housing 102, and shutter 103. Produce data collector 14 may additionally include color balancing filter 82, light source sensor 84, and ambient light sensor 86.

Light source 80 produces light 110. Light source 80 preferably produces a white light spectral distribution, and preferably has a range from four hundred 400 nm to 700 nm, which corresponds to the visible wavelength region of light.

Light source 80 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments include additional LEDs having different colors in narrower wavelength ranges and which are preferably used in combination with the broad-spectrum white light LED to even out variations in the spectral distribution and supplement the spectrum of the broad-spectrum white light LED. Feedback from light source sensor 84 may additionally be employed by control circuitry 96 to adjust desired intensity levels by varying the drive current to the LEDs. Use of these techniques may remove the necessity to use color balancing filter 82, thereby reducing cost, easing packaging constraints, and improving mechanical reliability.

Other types of light sources 80 are also envisioned by the present invention, although they may be less advantageous than the broad spectrum white LED. For example, a tungsten-halogen light may be used because of its broad spectrum, but produces more heat and optimally requires color balancing filter 82.

A plurality of different-colored LEDs having different non-overlapping wavelength ranges may be employed, but may provide less than desirable collector performance if gaps exist in the overall spectral distribution.

Color balancing filter 82 balances spectral throughput and increases the system signal-to-noise ratio when using light sources which alone or in combination with other light sources fail to produce a broad range of intensities across the entire spectral distribution. Color balancing filter 82 is designed to take into account the fact that system spectral throughput or intensity will not be equal for all wavelengths of light due to the intrinsic nature of light source 80, light separating element 92, and photodetector array 94. In designing color balancing filter 82, the spectral emissivity of light source 80, the spectral transmissivity of light separating element 92, and spectral responsivity of photodetector array 94 are all considered.

When employed, color balancing filter 82 preferably includes an absorptive glass filter or a thin-film filter on a glass substrate or a combination of absorptive and interference filters. Light 112 from color balancing filter 82 passes through windows 60 and 61 to illuminate produce item 18.

Light source sensor 84 monitors the spectrum of light 112 for changes in light source intensity and stability, which would adversely affect the operation of produce data collector 14. Light source sensor 84 includes one or more photodiodes and may include a bandpass filter to monitor only a portion of the emitted spectrum. Light source sensor 84 may also include light source current and voltage monitors for monitoring light source 80 for stability. Output signals 126 are processed by control circuitry 96. Light source sensor 84 could be mounted anywhere within the direct line of sight of light source 80 and can monitor light source 80 directly, instead of monitoring filtered light from color balancing filter 82. In the preferred embodiment, light source sensor 84 looks down at light source 80.

Ambient light sensor 86 senses the level of ambient light through windows 60 and 61 and sends ambient light level signals 128 to control circuitry 96. Ambient light sensor 86 is mounted anywhere within a direct view of window 61. In the preferred embodiment, light source sensor 84 looks down at light source 80.

Spectrometer 91 includes light separating element 92, photodetector array 94.

Light separating element 92 splits light 114 in the preferred embodiment into light 120 of a continuous band of wavelengths. Light separating element 92 is preferably a linear variable filter (LVF), such as the one manufactured Optical Coating Laboratory, Inc., or may be any other functionally equivalent component, such as a prism or a grating.

Photodetector array 94 produces waveform signals 122 containing spectral data. The pixels of the array spatially sample the continuous band of wavelengths produced by light separating element 92, and produce a set of discrete signal levels. Photodetector array 94 is preferably a complimentary metal oxide semiconductor (CMOS) array, but could be a Charge Coupled Device (CCD) array.

Control circuitry 96 controls operation of produce data collector 14 and produces digitized produce data waveform signals 124. For this purpose, control circuitry 96 includes an analog-to-digital (A/D) converter. A twelve bit A/D converter with a sampling rate of 22–44 kHz produces acceptable results.

Control circuitry 96 also receives signals from light source sensor 84 and ambient light sensor 86. In response to changes in light source monitor output signals 126, control circuitry 96 compensates for the changes and/or alerts an operator of transaction terminal 20.

In response to ambient light level signals 128, control circuitry 96 waits for ambient light levels to fall to a minimum level (dark state) before turning on light source 80. Ambient light levels fall to a minimum level when produce item 18 covers window 60. After control circuitry 96 has received waveform signals 122 containing produce data, control circuitry 96 turns off light source 80 and waits for ambient light levels to increase before returning to waiting for the dark state. Ambient light levels increase after produce item 18 is removed from window 60.

Control circuitry 96 controls shutter 103. Control circuitry 96 opens shutter 103 when it detects placement of produce item 18 over window 60. Control circuitry 96 closes shutter 103 when it fails to detect placement of produce item 18 over window 60.

Control circuitry 96 establishes periodic reference readings. Reference readings are desirable since component aging, dirt, and temperature and voltage changes may cause inaccuracies in collected produce data if significant. Control circuitry 96 may take as many readings as necessary. For example, control circuitry 96 may take ten reference readings per second, or one reference reading for each produce item, or five times a day.

Housing 102 contains light source 80, color balancing filter 82, light source sensor 84, ambient light sensor 86, stray light baffle 136, light separating element 92, photodetector array 94, control circuitry 96, and auxiliary transparent window 61. Transparent window 60 is located in a scale weigh plate 40.

Windows 60 and 61 include an anti-reflective surface coating to prevent light 112 reflected from windows 60 and 61 from contaminating reflected light 114.

Housing 102 is approximately five and a half inches in length by two and three quarters inches in width by one and three quarters inches in height.

Windows 60 and 61 may be rectangular, elliptical, and circular, instead of square. Windows 60 and 61 are about three quarters inches in width and length (square) or diameter (circular).

Window size affects the size of produce data collector 14. In order to minimize the angle of light reflected off of produce item 18 and received at light separating element 92, while maintaining as large of an output window as possible (in order to provide as a large of a sample area as possible) a minimum distance of approximately five inches is needed between window 60 and light separating element 92. If window 60 is reduced in diameter, thereby reducing the sampled area on produce item 18, the distance between object 18 and light separating element 92 can be reduced, keeping the angle the same.

Shutter 103 is mounted below transparent window 61. Shutter 103 may include a polymer dispersed liquid crystal (PDLC) or a motor-driven door (FIGS. 13A–13B) mounted to the underside of the top wall of housing 102.

The PDLC shutter allows about fifteen percent of ambient light to pass through it when de-energized. Produce data collector 14 takes reference illumination readings with the PDLC shutter energized and de-energized. When produce item 18 is placed over window 60, control circuitry 96 energizes the PDLC shutter, allowing about eighty-five percent of light 112 and eighty-five percent of light 114 to pass through it.

The motor-driven shutter includes a milky-white optically opaque screen with a white (or gray) diffusively-reflecting surface facing down towards detector 54. This surface serves as an internal reference for system calibration. The screen is moved to an open position and a closed position by a motor. Control circuitry 96 controls the motor.

When closed for taking reference readings, the motor-driven shutter prevents substantially all ambient light from passing through while reflecting about eighty-five percent of light 112. When open for taking reference readings or recognizing produce item 18, the motor-driven shutter allows substantially all of light 112 and 114 to pass through, as well as substantially all ambient light.

Operation of produce data collector 14 is automatic. Control circuitry 96 senses low level ambient signals 128 and turns on light source 80. Light separating element 92 separates reflected light 114 into different wavelengths to produce light 120 of a continues band of wavelengths. Photodetector array 94 produces waveform signals 122 containing produce data. Control circuitry 96 produces digitized produce data signals 124 which it sends to transaction terminal 20. Control circuitry 96 turns off light source 80 and waits for ambient light levels to increase before returning to waiting for the dark state. Control circuitry additionally monitors light source monitor output signals 126 for changes and compensates and/or alerts an operator of transaction terminal 20.

Advantageously, produce data collector 14 captures image data in about two tenths of a second, well within normal produce handling time.

Transaction terminal 20 uses produce data in digitized produce data signals 124 to identify produce item 18. Here, produce data consists of digitized waveforms which transaction terminal 20 compares to a library of digitized waveforms stored within produce data file 30. After identification, transaction terminal 20 obtains a unit price from PLU data file 28 and a weight from scale 16 in order to calculate a total cost of produce item 18. Transaction terminal 20 enters the total cost into the transaction.

With reference to FIGS. 8–13, produce data collector 14 is shown in further detail.

Produce data collector 14 additionally includes printed circuit board 130, light source assembly 132, turning mirror 134, stray light baffle 136, and turning mirror 138.

Printed circuit board 130 contains control circuitry 96 and forms a base for mounting color balancing filter 82, light source sensor 84, ambient light sensor 86, mount 89, light separating element 92, photodetector array 94, light source assembly 132, turning mirror 134, stray light baffle 136, and turning mirror 138. Printed circuit board 130 fastens to housing 102. Printed circuit board 130 serves as a carrier for all of the active components in this system, thus when it is manufactured and tested, the entire system can be tested by testing printed circuit board 130.

Light source assembly 132 includes light source 80, lower light source mount 140, and upper light source mount 142.

Light source 80 preferably includes a number of white LEDs which are arranged close to window 60 and in direct line of sight of window 60. Light source mounting assembly 132 is designed such that each individual LED is pointed at the top surface of window 60 so that there is uniform luminosity over the entire top surface of window 60 for illuminating produce item 18. In the preferred embodiment, the LEDs are all aimed at the center of window 60 and oriented at an angle of about 31.75 degrees. The LEDs are located at a distance of about 1.657 inches from the center of window 60, and 1.075 inches from the center of light source assembly 132.

The preferred embodiment provides uniformity in both spectrum and luminosity. Since it is highly desirable to avoid using complicated optical devices, such as lens systems and light pipes, for simplicity, the preferred embodiment envisions arrangements of multiple LEDs. The LEDs are spectrally matched in groups, and their placement and orientation achieves optimal uniformity in both spectrum and luminosity across the illuminated surface area.

To achieve uniformity in both spectrum and luminosity with multiple LEDs, the LED samples are first sorted into spectrally matched groups by computing and analyzing the matrices of linear correlation coefficients. The direct illumination from LEDs in a matched group will have a uniform spectrum regardless of their positions and beam orientations.

Second, LED positions and beam orientations are arranged to achieve uniform luminosity. If higher luminosity is needed to achieve adequate signal level, multiple groups can be used. The total illumination from multiple groups will be uniform in both spectrum and luminosity even if the spectra from different groups are different.

Figure 9:
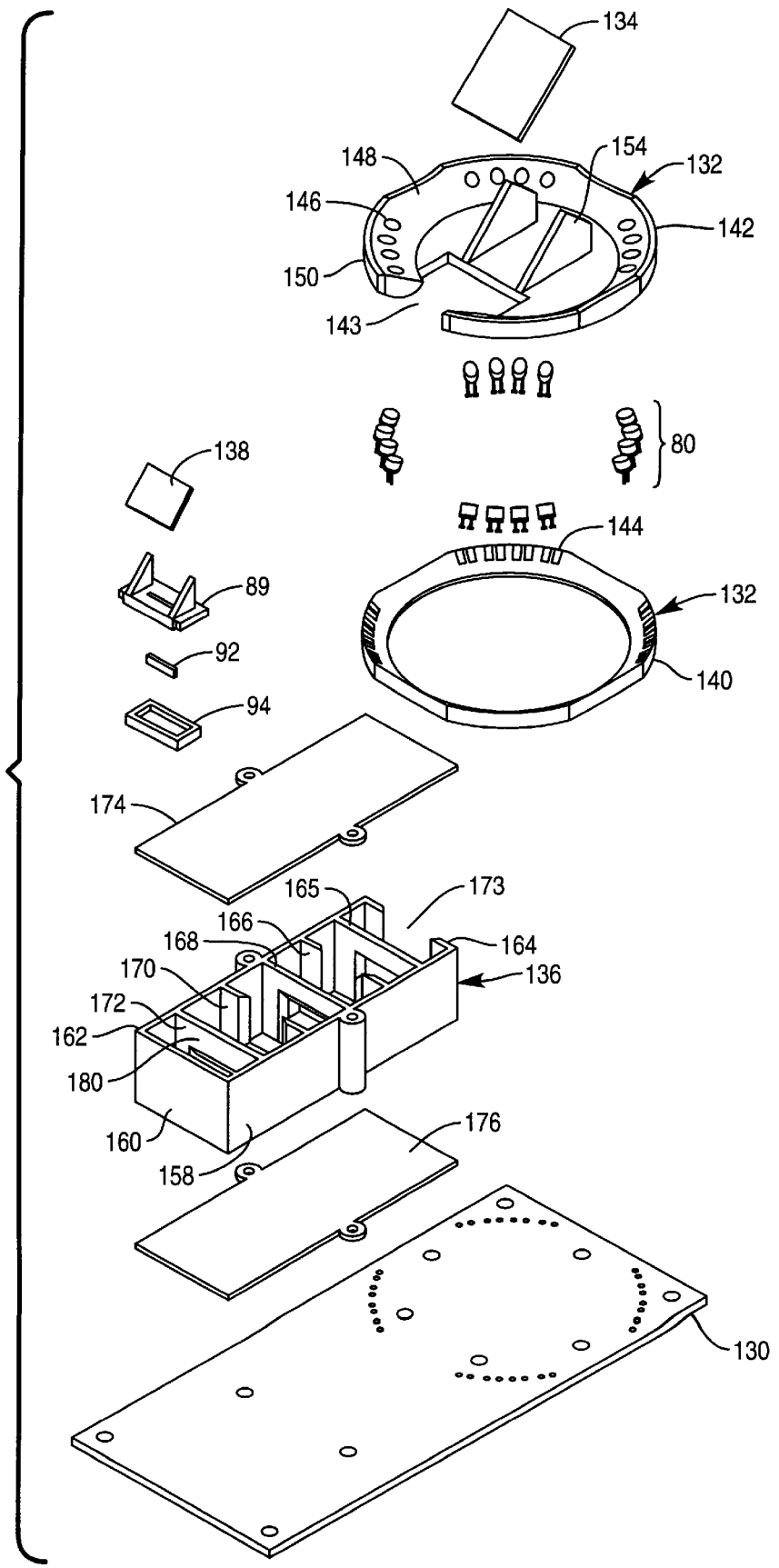
FIG. 9 is an exploded view of the optical components of the produce data collector.
Figure 10:
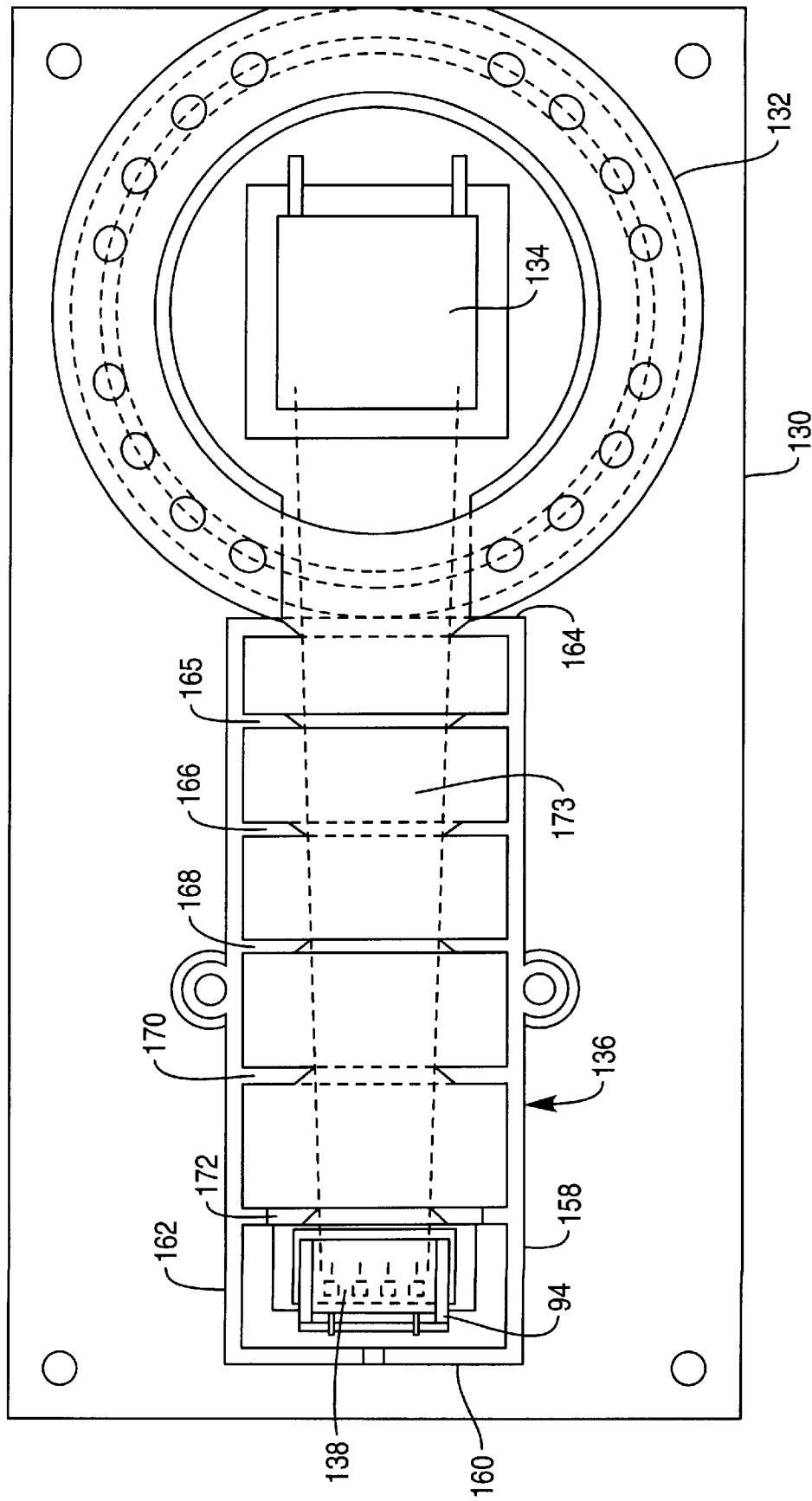
FIG. 10 is a top view of the assembled optical components of the produce data collector.
Figure 11:
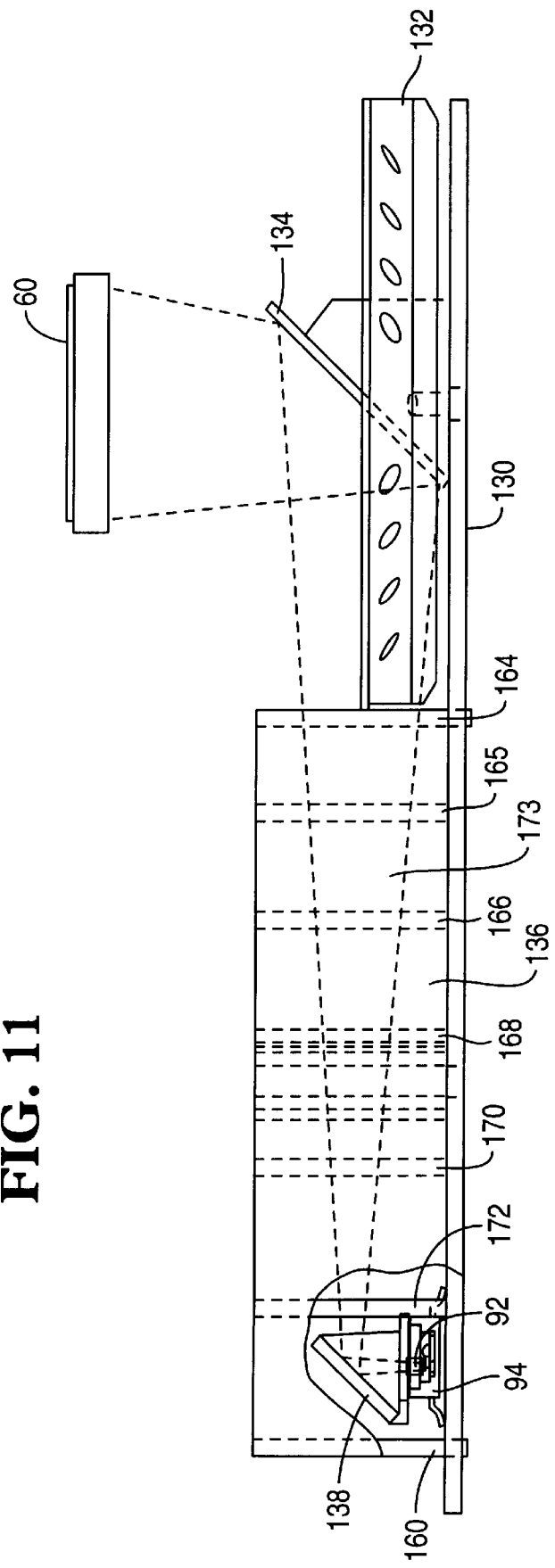
FIG. 11 is a side view of the assembled optical components of the produce data collector.

FIG. 9 shows sixteen white LEDs arranged in four groups of four LEDs on four sides of lower light source mount 140. Other arrangements are also envisioned by the present invention, such as two or four groups of four and eight LEDS. The use of a single white LED is also envisioned because it provides spectral uniformity, providing acceptable luminosity across window 60 only if window 60 is smaller. To achieve higher system efficiency, LEDs with a narrow, concentrated beam are preferred.

Lower light source mount 140 is generally circular in shape. This arrangement supports the LEDs in the preferred arrangement and orientation. Lower light source mount 140 connects mechanically and electrically to printed circuit board 130 and includes terminal connections 144 for light sources 80.

Upper light source mount 142 is also generally circular in shape and connects mechanically in mating relationship to lower light source mount 140. Upper light source mount 142 mechanically hold the LEDs in a preferred orientation for even illumination across the area of window 60. Upper light source mount 142 includes gap 143 which allows reflected light 114 to be directed to photodetector array 94. Upper light source mount 142 further includes apertures 146 through which light sources 80 emit light from positions below top surface 148. Top surface 148 angles downwardly from outer wall 150 to inner wall 152 perpendicular with the inclination angles of lights sources 80.

Turning mirror 134 routes reflected light 114 from produce item 18 through stray light baffle 136 towards turning mirror 138. Deflector mirror 134 is mounted at about a forty-five degree angle on base 154, which is incorporated into upper light source mount 142. Turning mirror 134 is preferably substantially planar and has a rectangular shape.

Turning mirror 138 directs reflected light 114 to light separating element 92. Turning mirror 138 is mounted at about a forty-five degree angle on mount 89. In the preferred embodiment (FIG. 9), turning mirror 138 is substantially planar and has a rectangular shape.

Alternate embodiments (FIG. 12), may incorporate turning mirrors 134 and 138 that are non-planar, i.e., have one or more radii of curvature and/or have the possibility of being segmented into multiple sections, each section with one or more radii of curvature.

In one such alternate embodiment, turning mirror 138 not only directs reflected light 114, but also produces equalized light of average reflected illumination by mixing reflected light 114. For this purpose, turning mirror 138 includes inner concave surface 153 and substantially planar textured surface 155. Textured surface 155 diffuses and scatters reflected light 114. Inner concave surface 153 converges the scattered light to reduce loss.

Alternate turning mirror 138 is made of a molded transparent acrylic and is mounted at about a forty-five degree angle on mount 89. Surface 155 is coated with aluminum using an evaporation process. The aluminum is an enhanced aluminum to provide the highest possible reflectance across the visible spectrum. Enhanced aluminum is ninety-seven percent reflective versus ninety-four percent reflective for regular aluminum coating.

All embodiments of mirrors 134 and 138 serve to direct light 114 to photodetector array 94.

Stray light baffle 136 mounts directly to printed circuit board 130 and helps to minimize the amount of light from light sources 80 that reaches photodetector array 94 directly, as well as any other sources of light other than the light reflected from produce item 18, such as ambient light. For this purpose, stray light baffle 136 includes outer walls 158–164, inner walls 165–172, top wall 174, and bottom wall 176. Outer walls 158–164 form a generally rectangular assembly. Outer wall 164 is adjacent to upper and lower light source mounts 140 and 142.

Walls 158, 160, 162 and 172 define a chamber containing turning mirror 138, mount 89, light separating element 92, and photodetector array 94. Photodetector array 94 is mounted directly to printed circuit board 130. Light separating element 92 is held within mount 89, which rests directly upon photodetector array 94. Light separating element 92 is held in close proximity to photodetector array 94.

Walls 158–162 cooperate to channel light turning mirror 138 through an ever-narrowing tunnel 173. Walls 165, 166, and 170 are generally U-shaped walls and provide a lower bound for tunnel 173. Walls 164, 168, and 172 are generally inverted U-shaped walls and provide an upper bound for tunnel 173. Tunnel opening 178 at wall 164 for receiving reflected light 114 from deflector mirror 134 is larger than tunnel opening 180 at wall 172. Tunnel openings 178 and 180 are optimally sized to allow as much light energy in reflected light 114 as possible to be incident on photodetector array 94, while restricting the angles of incidence of reflected light 114 to less than six degrees.

Advantageously, the preferred embodiment reduces spectral distortion without significant loss of reflected light levels. Reduction of spectral distortion is particularly important when light separating element 92 is an LVF or a dispersing element, such as a prism or a grating.

To reduce such spectral distortion, the present embodiment reduces the size of the field-of-view in at least two ways. First, light sources 80 are inwardly inclined in order to accommodate a smaller size for window 60 without significant loss in outgoing light levels. Second, distance between window 60 and light separating element 92 is increased to an optimum distance, consistent with the fact that the angle for light incident upon light separating element 92 must be less than six degrees. If the angle is greater than six degrees then there is unequal attenuation through light separating element 92 which adds error to the system. In other words, produce item 18 will appear to have different spectra characteristics when located at different locations on window 60.

As an alternate embodiment, a light pipe, or a light pipe in combination with a preceding condenser lens, may also be used between window 60 and light separating element 92 to further reduce the field-of-view effect by adding distance.

A third technique is to shift the LVF center such that its longer wavelength (red) end is closer to the center line of window 60, instead of aligning the LVF center along an optical path to the center of window 60. By placing the red end closer to the center, average incident angle is reduced for the longer wavelengths. Therefore, the absolute wavelength shift is smaller for longer wavelengths, while the opposite is true for the shorter wavelengths (the blue end). This technique works regardless of window shape.

Advantageously, housing 102 is small in size. In particular, it is much smaller than other produce data collectors, such as video cameras. Produce data collector 14 is even small enough in size to be mounted within an existing bar code reader or packaged as a light-weight (less than about eight ounces) hand-held unit.

Figure 13A:
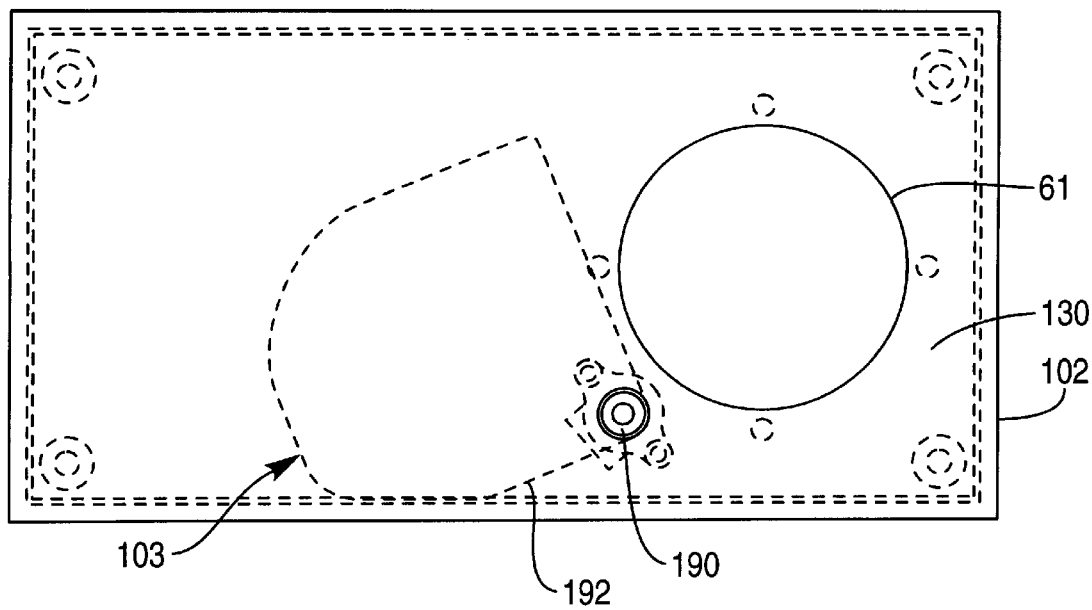
FIGS. 13A and 13B illustrate an electromechanical shutter arrangement.
Figure 13B:
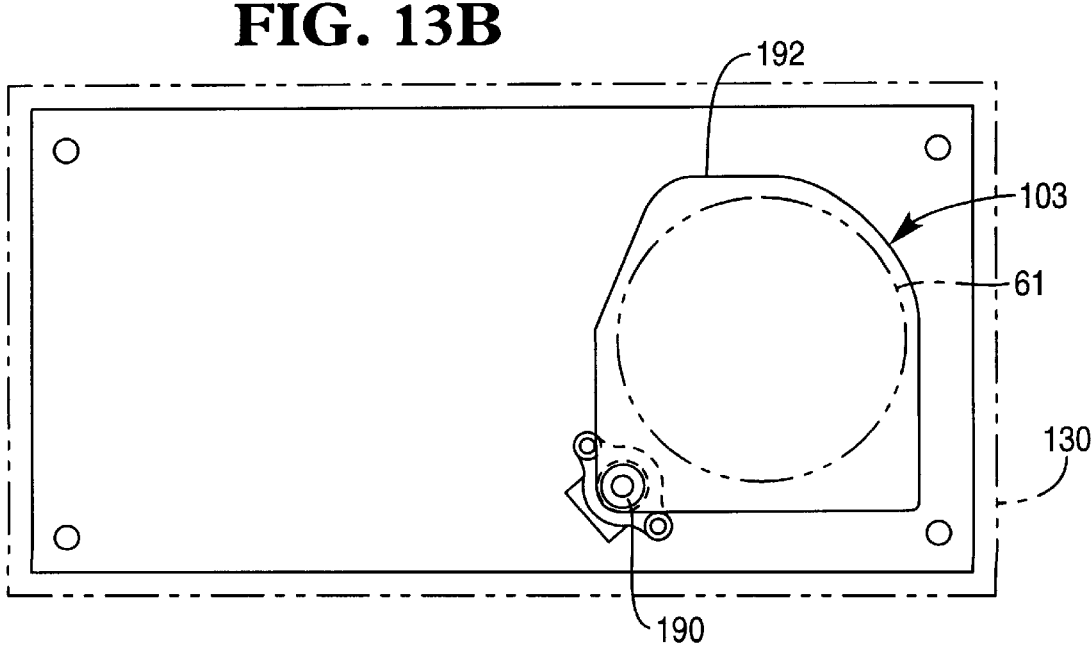

Turning now to FIGS. 13A–13B, electromechanical shutter 103 is mounted below and adjacent window 61. FIG. 13A shows both housing 102 and printed circuit board 130, while FIG. 13B shows only printed circuit board 130.

Shutter 103 includes motor 190 and door 192. Motor 190 is mounted to printed circuit board 130. Door 192 is mounted to the shaft of motor 190. Control circuitry 96 energizes motor 190 to place door 192 in an open position (FIG. 13A) and a closed position (FIG. 13B).

Although the invention has been described with particular reference to certain preferred embodiments thereof, variations and modifications of the present invention can be effected within the spirit and scope of the following claims. In particular, alternate embodiments may be further reduced or enlarged in size as window 60 is made smaller or larger. Also, the number light source 80 may change, but all of these variations are incorporated in the scope of present invention and may be considered alternative embodiments.

We claim:

1. An item checkout device comprising:
    a housing;
    a bar code data collector within the housing; and
    a produce data collector within the housing, including
        a light source for illuminating a produce item with substantially uniform light during a transaction;
        a light separating element for splitting light collected from the produce item into a plurality of different light portions having different wavelengths;
        a detector for converting energy in the plurality of light portions into a plurality of electrical signals; and
        a shutter for obscuring ambient light;
        control circuitry which digitizes the plurality of electrical signals to produce a digital spectrum from the produce item which contains information to identify the produce item for the purpose of determining the item unit price and which opens and closes the shutter to take reference ambient light readings.

2. The item checkout device as recited in claim 1, wherein the shutter comprises:
    a polymer dispersed liquid crystal (PDLC).

3. The item checkout device as recited in claim 1, wherein the shutter comprises:
    a door; and
    a motor for moving the door to an open position and to a closed position.

4. An item checkout device comprising:
    a housing;
    a bar code data collector within the housing; and
    a produce data collector within the housing including
        a housing containing an aperture;
        a light source for illuminating a produce item with substantially uniform light through the aperture during a transaction;
        a window in the aperture having an inner side with an anti-reflective coating which minimizes a portion of the substantially uniform light which reflects from the inner side of the window;
        a light separating element for splitting light collected from the produce item through the aperture into a plurality of different light portions having different wavelengths;
        a detector for converting energy in the plurality of light portions into a plurality of electrical signals; and
        control circuitry which digitizes the plurality of electrical signals to produce a digital spectrum from the produce item which contains information to identify the produce item for the purpose of determining the item unit price.

5. An item checkout device comprising:
    a housing;
    a bar code data collector within the housing; and
    a produce data collector within the housing including
        a housing containing an aperture;
        a light source for illuminating a produce item with substantially uniform light through the aperture during a transaction;
        a light separating element for splitting light collected from the produce item through the aperture into a plurality of different light portions having different wavelengths;
        a number of mirrors for directing collected light to the light separating element including
            a first mirror oriented at about a forty-five degree angle for re-directing the collected light from a first direction to a second direction at about ninety degrees from the first direction; and
            a second mirror oriented at about a forty-five degree angle for re-directing the collected light from the second direction to a third direction towards the light separating element at about ninety degrees from the second direction;
        a detector for converting energy in the plurality of light portions into a plurality of electrical signals; and
        control circuitry which digitizes the plurality of electrical signals to produce a digital spectrum from the produce item which contains information to identify the produce item for the purpose of determining the item unit price.

6. The item checkout device as recited in claim 5, wherein the first and second mirrors comprise planar mirrors.

7. The item checkout device as recited in claim 5, wherein one of the first and second mirrors also mixes the collected light to produce equalized light of average reflected illumination.

8. The item checkout device as recited in claim 7, wherein the one mirror comprises:
    an optical element having a inner concave inner surface and a planar surface; and
    a textured reflective layer on the planar surface which diffuses and scatters the collected light;
    wherein the inner concave inner surface converges scattered collected light.

9. The item checkout device as recited in claim 8, wherein the optical element is made of molded transparent acrylic.

10. The item checkout device as recited in claim 8, wherein the textured reflective layer comprises enhanced aluminum.

11. An item checkout device comprising:
    a housing;
    a bar code data collector within the housing; and
    a produce data collector within the housing including a housing containing an aperture;

a light source for illuminating a produce item with substantially uniform light through the aperture during a transaction;

a light separating element for splitting light collected from the produce item through the aperture into a plurality of different light portions having different wavelengths;

a baffle between the light source and the light separating element for minimizing an amount of the light from the light source which is directly incident upon the light separating element;

a detector for converting energy in the plurality of light portions into a plurality of electrical signals; and control circuitry which digitizes the plurality of electrical signals to produce a digital spectrum from the produce item which contains information to identify the produce item for the purpose of determining the item unit price.

12. The item checkout device as recited in claim 11, wherein the baffle comprises:

a plurality of adjacent chambers, including a first chamber closest to the light source and a second chamber farthest away from the light source;

wherein the light separating element is located in the second chamber.

13. A system for processing a produce item as part of a transaction in a transaction establishment comprising:

a checkout station for completing the transaction;

an item checkout device in the checkout station including
an optical bar code data collector including a first housing;
a scale within the first housing;
a weigh plate on the scale including a first window for allowing scanning light beams from optical bar code data collector to pass and a second window; and a produce data collector within the first housing, including
a second housing containing an aperture adjacent the second window;
a light source for illuminating a produce item on the second window with substantially uniform light;
a light separating element for splitting light collected from the produce item into a plurality of different light portions having different wavelengths;
a detector for converting energy in the plurality of light portions into a plurality of electrical signals; and
control circuitry which digitizes the plurality of electrical signals to produce a digital spectrum from the produce item which contains information to identify the produce item for the purpose of determining its unit price during a transaction;

a first database of reference digital spectra;

a second database of price information correlated to item identification information;

a computer within the checkout station and coupled to the control circuitry, the first and second databases, and the scale, which compares the digital spectrum from the produce item with the reference digital spectra in the first database to determine item identification information for the produce item, which obtains unit price information from the second database using the item identification information for the item, and which determines a price for the produce item from the unit price information and weight information from the scale, and which adds the price of the produce item to the transaction.

* * * * *